United States Patent
Zhang et al.

(10) Patent No.: US 7,616,807 B2
(45) Date of Patent: Nov. 10, 2009

(54) SYSTEM AND METHOD FOR USING TEXTURE LANDMARKS FOR IMPROVED MARKERLESS TRACKING IN AUGMENTED REALITY APPLICATIONS

(75) Inventors: Xiang Zhang, Lawrenceville, NJ (US); Yakup Genc, Dayton, NJ (US); Visvanathan Ramesh, Plainsboro, NJ (US); Yanghai Tsin, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 691 days.

(21) Appl. No.: 11/359,673

(22) Filed: Feb. 22, 2006

(65) Prior Publication Data
US 2006/0188131 A1    Aug. 24, 2006

Related U.S. Application Data

(60) Provisional application No. 60/656,504, filed on Feb. 24, 2005, provisional application No. 60/666,487, filed on Mar. 30, 2005.

(51) Int. Cl.
*G06K 9/00* (2006.01)
*G06K 9/32* (2006.01)
*G06T 15/00* (2006.01)

(52) U.S. Cl. .................. 382/154; 382/103; 382/285; 345/419

(58) Field of Classification Search .............. 382/154, 382/285, 103; 348/578, 580; 345/419–421, 345/427
See application file for complete search history.

(56) References Cited

U.S. PATENT DOCUMENTS

| | | | | |
|---|---|---|---|---|
| 6,597,818 | B2 * | 7/2003 | Kumar et al. | 382/294 |
| 7,103,211 | B1 * | 9/2006 | Medioni et al. | 382/154 |
| 2003/0012410 | A1 * | 1/2003 | Navab et al. | 382/103 |

OTHER PUBLICATIONS

Jin et al. (Jul. 2001) "Real-time feature tracking and outlier rejection with changes in illumination." Proc. 8$^{th}$ IEEE Int'l Conf. on Computer Vision (ICCV 2001), vol. 1 pp. 684-689.*
Lepetit et al. (Oct. 2003) "Fully Automated and Stable Registration for Augmented Reality Applications." Proc. 2$^{nd}$ IEEE/ACM Int'l Symposium on Mixed and Augmented Reality, pp. 93-102.*

(Continued)

*Primary Examiner*—Brain P Werner
*Assistant Examiner*—Barry Drennan
(74) *Attorney, Agent, or Firm*—David B. Paschburg; F. Chau & Associates, LLC

(57) ABSTRACT

A method of tracking a pose of a moving camera includes receiving a first image from a camera, receiving a sequence of digitized images from said camera, recording, for each of said sequence of digitized images, the pose and 2D correspondences of landmarks, reconstructing a location and appearance of a 2-dimensional texture patch from 2D correspondences of the landmarks by triangulation and optimization, computing back-projection errors by comparing said reconstructed texture patch with said first received image; and reconstructing said location and appearance of said 2-dimensional texture patch from the 2D correspondences of the landmarks of said sequence of digitized images by triangulation and optimization after eliminating those landmarks with large back-projection errors.

17 Claims, 6 Drawing Sheets

OTHER PUBLICATIONS

Nister, D. (Nov. 2005) "Preemptive RANSAC for live structure and motion estimation." Machine Vision and Applications, vol. 16 No. 5, pp. 321-329.*

Shi et al. (Jun. 1994) "Good features to track." Proc. 1994 IEEE Comp. Sci. Soc. Conf. on Computer Vision and Pattern Recognition (CVPR 1994), pp. 593-600.*

Werner et al. (May 2002) "New Techniques for Automated Architectural Reconstruction from Photographs." 7$^{th}$ European Conf. on Computer Vision (ECCV 2002), vol. II, pp. 541-555.*

Genc et al. (Aug. 2003) "Marker-less tracking for AR: a learning-based approach." Proc. 1$^{st}$ Int'l Symposium on Mixed and Augmented Reality, pp. 295-304.*

Jajuga et al. (Mar. 1999) "Standardisation of data set under different measurement scales." In Classification and Information Processing at the Turn of the Millennium, pp. 105-112.*

Davison et al. (Jul. 2002) "Simultaneous Localization and Map-Building Using Active Vision." IEEE Trans. on Pattern Analysis and Machine Intelligence, vol. 24 No. 7, pp. 865-880.*

* cited by examiner

| Video/Frame | Landmark On | Landmark Off |
|---|---|---|
| 1 / 606 | ≤2 | 8.72 |
| 2 / 237 | ≤2 | 8.55 |
| 3 / 1050 | 20.33 | 32.19 |
| 4 / 350 | 8.72 | 69.96 |

FIG. 3

SYSTEM AND METHOD FOR USING TEXTURE LANDMARKS FOR IMPROVED MARKERLESS TRACKING IN AUGMENTED REALITY APPLICATIONS

CROSS REFERENCE TO RELATED UNITED STATES APPLICATION

This application claims priority from "Using Texture Landmarks for Improved Markless Tracking in AR Applications", U.S. Provisional Application No. 60/656,504 of Genc, et at., filed Feb. 24, 2005, the contents of which are incorporated herein by reference, and from "Pose Estimation by Maximum Sum of Sampled Density", U.S. Provisional Application No. 60/666,487 of Genc, et al., filed Mar. 30, 2005, the contents of which are incorporated herein by reference.

TECHNICAL FIELD

This invention is directed to the camera tracking and pose estimation in augmented reality and computer vision applications.

DISCUSSION OF THE RELATED ART

The self motion of the camera, those cases where the camera is not fixed, but is hand-held or worn by a person, is referred to as ego motion. Estimating the motion of a moving camera in an unknown environment is useful for a number of applications such as robot navigation, surveillance, as-built reconstruction and augmented reality (AR). In AR, users are provided with an enhanced visualization of the real world. This is achieved by superimposing the real world views with aligned virtual objects generated by computers. Vision-based methods for estimating the position and orientation of the virtual display with respect to the environment provides flexible and cost effective solutions. Robust and efficient solutions to the problem are yet to be available.

In computer vision, camera motion estimation and scene structure recovery is studied under the topic of structure from motion (SFM). The literature is full of papers covering many aspects of the problem, from the basics of triangulation to critical motion sequences, which do not provide unambiguous estimates of motion or structure. Much of this work assumes the availability of correspondences that can be obtained using feature extractors and tracked over a number of frames using optical flow techniques. Other researchers have addressed the SFM problem with an emphasis on the feature extraction and correspondence problem, however, most of these methods fail to deliver real-time performance.

AR systems need to register the coordinate system in which the virtual objects are defined with the real world. Despite recent attempts to initialize tracking algorithms with wide-base line feature matching, known landmarks or markers provide the most feasible solution. The availability of the markers for tracker initialization enables an approach for single camera motion tracking and 3D model building and obtain metric results of camera motion.

Traditional pose estimation algorithms rely on either registering appearance patches or tracking salient point features. However, appearance-based approaches suffer from varying illumination and object appearance changes such as difference in coating. These appearance changes happen routinely in industrial settings, due to dust, grease, the painting preferences and complex environmental lightings. Thus appearance-based approach is difficult to use in industrial environment. On the other hand, the performance of feature-based pose estimation relies heavily on the feature trackers. To make feature trackers work, pictures must be taken in quick successions. But over time a set of features can become occluded or too biased to be useful. A new set of features would need to be detected and tracked. Even worse, many industrial objects have rounded appearances and there are very few feature points to be tracked reliably.

One approach is to extract the camera pose from the coded visual markers at the initialization stage. These markers are used only for the initialization (bootstrap) and can be removed once the tracker is initialized. At the same time, the most salient visual features are selected from the scene (the corners) for reconstructing the 3D model of the environment. Frame to frame tracking of these features can be performed using the Lucas-Kanade tracker. The reconstructed model and the corresponding tracked features can be used to recover the pose for the views where the markers are not visible. This way the tracking range can be extended to regions further away from the visual markers. However, One problem with the above approach is the drift in feature tracking. The reason for this drift is that the optical flow tracking is vulnerable to large motions. The corner correspondences often drift away from the correct feature position during tracking. This drift introduces error into the tracking and 3D model reconstruction.

Two ways to eliminate the error in the estimated camera motion caused by the drift in feature tracking include using the texture landmarks to correct the camera pose periodically so that motion tracking is more stable, and using more reliable visual features such as linear or curve edges from the scene.

To be accurate in terminology, one should distinguish between two types of features that can be used for such tracking purpose. The first class of features are obtained by tracking/identifying reliable corners. The characteristics of these feature points is that they can be unambiguously located in an image. These features are referred to as point-features because they correspond to intersections of lines and scale space/curvature extrema, or physical points in 3D. The second set of features that can be easily detected in an image are edge pixels. In contrast to the point-features, there are always unsolvable ambiguities along the edge direction. This is known as the aperture problem in optical flow study. To distinguish edge pixels from the 2D localizable point-features, they are referred to as point-samples because they represent a discrete instance of a geometric object (a curve) given the sampling characteristics of an imaging device. The major difference between a point-feature and a point sample is that a point-feature is independent of the sampling property of a camera. A point-feature always presents in visible views and all instances of a point-feature refer to the same 3D point.

Sometimes point-samples need to be adopted in a tracking system. There have been many successful point-feature based tracking methods. However, if an object contains too few point-features, the performance of these methods will be compromised. It becomes necessary to consider tracking methods that utilize the second set of points as well.

It is also beneficial to use point-samples even when there are enough point-features for tracking. Point-samples occur as often as point-features and they usually appear in large quantities. It is not unusual that the number of edge pixels can be several magnitudes larger than the number of localizable corners in a natural image. Proper utilization of the point-samples can result in very accurate tracking algorithms due to their sheer numbers. In addition, point-sample representation is very flexible in modeling all kinds of curves. A point-sample based algorithm does not need to know the parametric form of a curve or fit a curve to the points in order to track. Given the point sampling nature of common sensors such as cameras and laser range finders, it is also quite convenient to work with point samples directly.

SUMMARY OF THE INVENTION

Exemplary embodiments of the invention as described herein generally include methods and systems for augmented optical-flow-based tracking by building a landmark representation around reliably reconstructed features. A planar patch around the reconstructed feature point provides matching information that prevents drifts in flow-based feature tracking and allows establishment of correspondences across the frames with large baselines. Selective and periodic correspondence mappings improve scene and motion reconstruction while adhering to the real-time requirements.

Further embodiment of the invention generally include methods and systems for a point-sample based tracking method, where instead of corner detection as a preprocessing step in point-feature based trackers, edge detection is used to extract point-samples. A 3D point-sample based model that corresponds to the edge pixels is constructed offline and projected to a test image. The two sets of point-samples are compared in a probabilistic sense and an efficient and accurate tracking algorithm is derived. The point-samples model 3D curves as a result of reflectance changes on a surface, ridges or creases on an object, or simply the occluding contour of a smooth object.

According to an aspect of the invention, there is provided a method for tracking a pose of a moving camera, the method including receiving a first received digitized image from a camera, said image comprising a plurality of intensities corresponding to a domain of points on a 2-dimensional grid, and including one or more landmarks for tracking, receiving a sequence of digitized images from said camera, each image comprising a plurality of intensities corresponding to a domain of points on a 2-dimensional grid, recording, for each of said sequence of digitized images, the pose and 2D correspondences of each of said landmarks, reconstructing a location and appearance of a 2-dimensional texture patch from the 2D correspondences of the landmarks of said sequence of digitized images by triangulation and optimization, computing back-projection errors by comparing said reconstructed texture patch with said first received image, and reconstructing said location and appearance of said 2-dimensional texture patch from the 2D correspondences of the landmarks of said sequence of digitized images by triangulation and optimization after eliminating those landmarks with large back-projection errors.

According to a further aspect of the invention, the sequence of images comprises a plurality of intensities corresponding to a domain of points on a 3-dimensional (3D) grid.

According to a further aspect of the invention, recording the pose and 2D correspondences of each of said landmarks comprises recording a texture patch about each said landmark, the camera pose from which said texture patch is obtained, and about each said landmark, a set of 3D coordinates of nearby neighbor features.

According to a further aspect of the invention, the one or more landmarks are selected based on how well its 3D coordinates can be reconstructed, and wherein said landmarks are evenly distributed among the reconstructed landmarks.

According to a further aspect of the invention, the one or more landmarks are selected based on a reliability measure r comprising the term $b_{max}/(\epsilon_{avg}+\epsilon_{std})$, wherein $b_{max}$ is a maximum distance between camera centers, $\epsilon_{avg}$ is an average back-projection error distance, and $\epsilon_{std}$ is a standard deviation of back-projection errors.

According to a further aspect of the invention, the landmarks are separated by at least a pre-defined threshold distance in the reconstructed image.

According to a further aspect of the invention, the method comprises searching for a best match of each landmark correspondence in said reconstructed texture patch, wherein a search range is determined by a maximum back-projection error, wherein said best match is found by minimizing a sum of square differences.

$$d(I_{norm})^2 = \sum_{i=0,j=0}^{i<n_p,j<n_p} (I_c^{norm}(i_c, j_c) - I_0^{norm}(i, j))^2,$$

wherein $n_p$ is a size of said texture patch for each landmark, $i_c$ and $j_c$ are feature point coordinates, $I_{norm}$ is the normalized intensity of a point defined by $$I_{norm} = \frac{I - I_{avg}}{I_{max} - I_{min}},$$

wherein I is a intensity before normalization, and $I_{avg}$, $I_{max}$, and $I_{min}$ are the average, maximum, and minimum intensity values of the texture patch, respectively.

According to a further aspect of the invention, the method comprises deforming the landmark feature coordinates $i_c$ and $j_c$ using an approximate affine transformation $$i_c = a_{11}(i_0 - n_p/2) + a_{12}(j_0 - n_p/2) + u_c,$$

$$j_c = a_{21}(i_0 - n_p/2) + a_{22}(j_0 - n_p/2) + v_c,$$

wherein $u_c$ and $v_c$ are landmark coordinates, and $a_{11}$, $a_{12}$, $a_{21}$, and $a_{22}$ are elements of a matrix that back-projects landmark coordinates $u_c$, $v_c$ to the corresponding coordinates in the first image.

According to a further aspect of the invention, the method comprises determining a likelihood score $S_{l,k}$ for each feature point k of landmark l from $$S_{l,k} = w_\lambda(\lambda(u_c, v_c) - \lambda_0) + w_I \sqrt{\overline{d(I_{norm})^2}}/n_{pix},$$

wherein $n_{pix}$ is the number of pixels in the texture patch of landmark l, $\lambda(u_c, v_c) - \lambda_0$ are the smallest eigenvalues of the current candidate pixel $(u_c, v_c)$ and the original pixel respectively, and $w_\lambda$ and $w_I$ are predetermined weighting factors.

According to a further aspect of the invention, the method comprises using a RANSAC algorithm to eliminate those landmarks with large back-projection errors.

According to a further aspect of the invention, the landmarks comprise corners and edges of an object depicted in said first image.

According to another aspect of the invention, there is provided a program storage device readable by a computer, tangibly embodying a program of instructions executable by the computer to perform the method steps for tracking a pose of a moving camera.

BRIEF DESCRIPTION OF THE DRAWINGS

FIG. 3 is a table of average back-projection error for various video sequences, according to an embodiment of the invention.

DETAILED DESCRIPTION OF THE PREFERRED EMBODIMENTS

Figure 1:
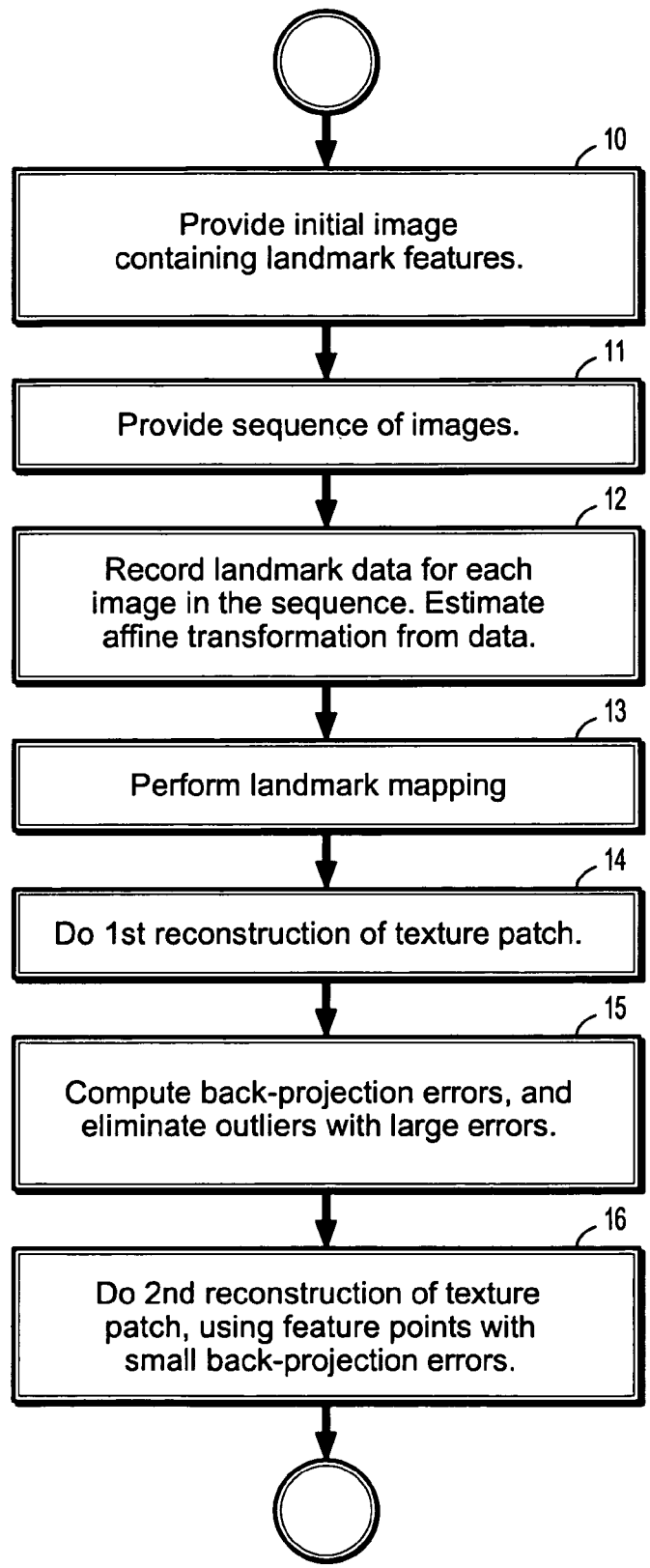
FIG. 1 is a flow chart of a real-time ego motion estimation algorithm according to an embodiment of the invention.

Exemplary embodiments of the invention as described herein generally include systems and methods for camera tracking and pose estimation. However, specific structural and functional details disclosed herein are merely representative for purposes of describing example embodiments of the present invention. This invention may, however, be embodied in many alternate forms and should not be construed as limited to the embodiments set forth herein.

An object of interest according to an embodiment of the invention is represented by a geometric entity G, such as a set of curves. G can be measured by a discrete imaging device such as a camera plus an edge detector. The discrete measurement process can be considered as a sampling process denoted as $\phi(G, \theta)$. Note that a sampling process $\phi(\cdot, \theta)$ involves both geometric projection and taking discrete samples.

In an offline modeling step, a reference model is obtained by sampling G from a reference view, $M = \phi_m(G, \theta_m)$, referred to as a model point set. Note that all model points are in 3D in this problem domain. If the imaging device is a camera, it can be assumed that the depth of the edge pixels in a reference view can be reconstructed by a stereo method.

In an online tracking step, a sequence of point sets are selected from different views while the imaging device moves in 3D space. At any time, the resulting point-sample set is $D = \phi_d(G; \theta_d)$, which is referred to as a data point set. In this problem domain, all data point-samples are 2D edge pixels. The view at which a data point set is taken is referred to as a test view.

In the following, it can be assumed that: (1) the cameras are internally calibrated; (2) the initial pose of the first frame is given; (3) the connectivity among the model points is understood; and (4) the errors in calibration and modeling are much smaller than the data point set noise. It is desired to estimate online the relative pose of each test view with respect to the objects of interest.

In a texture landmark approach for pose correction according to an embodiment of the invention, at the initialization stage, landmarks are selected from the point features with the most distinctive texture patterns and the most reliable 3D reconstructions. The 3D coordinates of the landmarks are recorded together with the associated camera pose information. The current texture can be matched with the recorded landmark texture by making use of the affine invariance of planar features. Since the texture patterns are not affected by the tracking drift, the correspondences are usable for camera pose correction. A random sample consensus (RANSAC) algorithm is applied to help ensure the real-time constraint and robust pose estimation.

An ego motion algorithm according to an embodiment of the invention tracks the most salient point features (corners) from frame to frame. The camera poses are computed from the visual markers during the initialization stage and then are estimated from the reliably reconstructed corner features afterwards. The camera internal parameters are calibrated in advance. For good real-time performance, the number of features tracked and the number of samples used for 3D model reconstruction are dynamically controlled. This keeps the running time required for a flow-based feature tracking within predefined bounds. At the same time, during a 3D reconstruction of the point features, the triangulation result is used as the initial value for non-linear optimization. The computational cost of such a process increases with the number of points and the number of frames sampled for each point. As in the flow-based tracking, the number of features being reconstructed at any given time is limited to keep the processing time within predefined bounds.

According to an embodiment of the invention, a two stage 3D reconstruction can be utilized in the model building process. The steps involved are (1) landmark selection and recording, (2) landmark mapping, and (3) fast and robust pose estimation with landmarks. For each sampled frame, the pose and the 2D correspondences of the most salient features are recorded. When the number of samples exceeds a threshold, a first stage of reconstruction is applied, a triangulation followed by a nonlinear optimization. The threshold is determined by the number of frames required for a reliable reconstruction, as found through numerical experiments. After the first stage, the back-projection errors for each sampled frame are computed to evaluate the reliability of the initial reconstruction results. The reconstruction stage, the 2nd stage round of triangulation and optimization, is applied after eliminating those outliers that have large back-projection errors.

Periodically, affine-invariant texture landmarks are used to prevent drift. This further improves the reliability of the estimated camera motion.

A texture landmark should be located on reliably reconstructed points. A point's reliability r is a function of how well its 3D coordinates can be recovered. A simple method according to an embodiment of the invention is based on the back-projection error distribution and the maximum baseline of the reconstruction sample frames:

$$r = f(b_{max}, \epsilon_{avg}, \epsilon_{std})$$

where $b_{max}$ is the maximum distance (baseline) between the camera centers, $\epsilon_{avg}$ is the average back-projection error (distance in pixels), and $\epsilon_{std}$ is the standard deviation of back-projection errors. These are available from the reconstruction step. There are many ways to compare the reliabilities of the reconstructions. One exemplary, non-limiting definition of f is $b_{max}/(\epsilon_{avg}+\epsilon_{std})$, which yields good experimental results as well as fast computation of the reliability measures.

Another condition on the choice of landmark is that they should be evenly distributed among the reconstructed features. According to an embodiment of the invention, one point is selected from a group of (usually 5-10) features with highest reliability measures. Assuming that $d_{ij}$ is the distance between two reconstructed features i and j, if feature point i is already a landmark position, and $d_{ij} < d_{min}$, where $d_{min}$ is the pre-defined threshold distance between landmarks, then the feature j is not chosen as a landmark.

The following data associated with a chosen landmark is recorded:

1. A square texture patch. The size of the texture, $n_p \% n_p$, is usually 7-11 pixels.
2. The 3D coordinates of the selected landmark.
3. The set of nearby reconstructed points. These points, usually about 5 in number, are then known as the neighbor features of the landmark.
4. The camera pose, which is the pose of the camera from which the texture is chosen.

In man-made environments, most of the immediate surroundings of the reconstructed features can be viewed as nearly planar. Furthermore, the scene depth is usually less than the distance to the scene from the camera. Therefore, it can be assumed that most of the texture landmarks chosen as described above are affine-invariant with respect to large camera motion and moderate illumination changes.

For a given landmark m, the affine transformation from the source image $f_0$ to the current frame $f_c$ can be estimated as follows. The projection of a landmark and its neighboring features in frame $f_0$, $(u_0^i, v_0^i)$, is recorded along with the landmark texture. The projection of these features on the current frame $f_c$, $(u_c^i, v_c^i)$ can be obtained directly from the tracked features, even though there maybe drifting error, or estimated from the current camera pose:

$$\begin{pmatrix} u_c^i \\ v_c^i \\ 1 \end{pmatrix} = A \begin{pmatrix} u_0^i \\ v_0^i \\ 1 \end{pmatrix}$$

where A is the approximate affine transformation matrix given by:

$$A = \begin{pmatrix} a_{11} & a_{12} & a_{13} \\ a_{21} & a_{22} & a_{23} \\ 0 & 0 & 1 \end{pmatrix}.$$

Given the observations, the affine transformation is estimated by solving the above linear system. The first 2% 2 matrix of A describes the scaling and rotation of the affine transformation.

For landmark mapping, one searches for the best match in the immediate neighborhood of the current tracked position of the corresponding feature. Since there may be a drift in feature tacking, a search region is defined for the landmark mapping. This search range is a function of the error caused by the flow-based tracking $err_{drift}$, the 3D reconstruction error $err_{recon}$, and the error coming from the pose $err(R_c, t_c)$. The error functions for both coordinates are:

$$S_u(err_{drift}, err_{recon}, err(R_c, t_c))$$

and $$S_v(err_{drift}, err_{recon}, err(R_c, t_c))$$

Since one is interested in real-time performance, a fast method is used to compute the serach ranges. In particular, the landmark search range is determined by the maximum back-projection errors of the reconstructions. In an embodiment of the invention, the landmark search is carried out within a rectangular region defined by $(u_c-S_u, u_c+S_u, v_c-S_v, v_c+S_v)$. The values of $S_u$ and $S_v$ are dynamically set to be proportional to the maximum back-projection error.

Within the search range, the most salient feature points are selected as the candidates for computing the affine map. This reduces the computational effort for the texture mapping process significantly.

Making use of the affine invariance, the landmark mapping is performed by finding the minimum of the following sum of difference squares:

$$d(I_{norm})^2 = \sum_{i=0, j=0}^{i<n_p, j<n_p} (I_c^{norm}(i_c, j_c) - I_0^{norm}(i, j))^2,$$

where $i_c$ and $j_c$ are deformed using the approximate affine transformation:

$$i_c = a_{11}(i_0 - n_p/2) + a_{12}(j_0 - n_p/2) + u_c,$$

$$j_c = a_{21}(i_0 - n_p/2) + a_{22}(j_0 - n_p/2) + v_c.$$

In the above computation, normalized intensity values were used to take into account illumination variations. The normalization is defined as $$I_{norm} = \frac{I - I_{avg}}{I_{max} - I_{min}},$$

where $I_{norm}$ is the normalized intensity of a pixel, I is the intensity before normalization, $I_{avg}$, $I_{max}$, and $I_{min}$ are the average, maximum, and minimum intensity values of the texture patch, respectively.

The score of likelihood for each candidate of the landmark can now be computed. For candidate k of landmark l, define:

$$S_{l,k} = w_\lambda(\lambda(u_c, v_c) - \lambda_0) + w_I \sqrt{d(I_{norm})^2} / n_{pix},$$

where $n_{pix}$ is the number of pixels in the texture patch of a landmark, $\lambda(u_c, v_c) - \lambda_0$ is the smaller eigenvalue of the current candidate pixel $(u_c, v_c)$ and the original pixel respectively. In this equation, the weight for the eigenvalue is chosen to be $w_\lambda = 0$, and the weight for the template matching is chosen to be $w_I = 1$, then the scores of the landmark matching candidates can be sorted only by the template matching. After the computation, the candidates are sorted by their scores.

Even if only three candidates for each landmark are kept, there may still be too many possible combinations to test for pose correction. For example, if there are 10 landmarks in the view, one needs to test for $3^{10}$ cases. To achieve real-time performance, one needs a scheme to find the best combination of the landmark matches in the given computation time.

To address the real-time constraint, a random sample consensus (RANSAC) algorithm is used to find the 'correct' candidate matches. The RANSAC algorithm is a method of fitting model parameters in the presence of many data outliers. If there are M data items in a dataset, N data items are selected at random to estimate a set of parameters x. Then, the number of data items K of M that fit the model parameters x within a predefined tolerance is determined. If K is large enough, the fit is accepted, other wise the previous steps are repeated. If, after repeating a predetermined number of steps, K is not large enough, the model is said to have failed.

For the case of correcting camera pose, for each landmark in view, three candidates with best likelihood scores are chosen. In addition, candidates with low probabilities are trimmed: when the third lowest score is at least twice the second lowest score, the third candidate is discarded, and the procedure is repeated with the second lowest scored candidate. After trimming, the candidate lists of all m landmarks look like the following:

|  | Candidate. List | Probabilities |
| --- | --- | --- |
| $M_1$ | $\{C_{1,1}, C_{1,2}, C_{1,3}\}$ | $\{p_{1,1}, p_{1,2}, p_{1,3}\}$ |
| $M_2$ | $\{C_{2,1}, C_{2,2}\}$ | $\{p_{2,1}, p_{2,2}\}$ |
| . | | |
| . | | |
| . | | |
| $M_l$ | $\{C_{l,1}\}$ | $\{p_{l,1}\}$ |
| . | | |
| . | | |
| . | | |
| $M_m$ | $\{C_{m,1}, C_{m,2}, C_{m,3}\}$ | $\{p_{m,1}, p_{m,2}, p_{m,3}\}$ |

Here, $p_{ij}$ is the probability of the $j^{th}$ candidate matches the $i^{th}$ landmark. In most cases, $p_{i,1} > p_{i,2} > p_{i,3}$.

From m landmarks in the view, randomly pick $m_f$ landmarks, and pick one candidate for each forming a hypothesis. The refined candidates (re-fining the location of the candidates to sub-pixel) and the 2D correspondence of the landmarks are used to compute the pose ($m_f \geq 4$).

Using the pose estimated from a hypothesis, the back projection of all of the reconstructed 3D features is computed. If the back-projection of a feature falls in the given search range defined by $S_u$ and $S_v$, the feature is counted as one vote for the hypothesis. From the $N_{try}$ hypotheses, the winner is picked as the one with the maximum number of votes. A tie is broken by picking the hypothesis with the smaller back-projection displacement.

This process will always pick the candidate with the highest likelihood first to form a hypothesis. Considering a hypothesis formed with n points, the probability of having at least a correct combination among the $N_{try}$ hypotheses is:

$$P = 1 - \left(1 - \prod_{i=1}^{n} p_{,1}^i\right)^{N_{try}},$$

where $p_{,j}^i = p_{k,1}$ if it is the $i^{th}$ candidate for landmark k. For cases where n=4, $p_{,j}^i \geq 0.7$, and $N_{try} = 10$, one obtains $P \geq 0.936$. This shows that the majority of the time the right matches are obtained with a limited number of tests. If no matches are found, the system will just pass the step for the current frame, and will perform a pose correction for the next frame.

A flow chart of a real-time ego motion estimation algorithm according to an embodiment of the invention is depicted in FIG. 1. Referring now to the figure, an initial image is provided at step 10, from which an initial camera pose can be extracted. The pose can be estimated by using markers to indicate landmark features to be tracked. However, these markers are used only for this initial image. A sequence of images is received from the camera at step 11. The number of images in the sequence is determined by the number needed for a reliable reconstruction of the landmarks in the initial image. At step 12, data associated with the landmarks to be tracked is recorded for each image, including, as described above, a texture patch, the 3D coordinates of the landmark, coordinates of nearby features, and the camera pose. The affine transformation that transforms the current feature coordinates back to the initial feature coordinates can be estimated from the data recorded for each image. Landmark mapping is performed at step 13, where features for each landmark are selected by minimizing a sum of square differences of intensities, as described above, and computing a likelihood score for each feature of the landmark. At step 14, the location and appearance of a texture patch is reconstructed from the feature point coordinates and camera pose using triangulation and optimization. The back-projection errors are computed at step 15 by comparing the reconstructed feature points with the feature points in the initial image. Those feature points with large back projection errors are then eliminated. According to an embodiment of the invention, a RANSAC algorithm can be used to eliminate those outliers with large errors. The second reconstruction stage is performed at step 16, using those feature points that were not eliminated.

Figure 2:
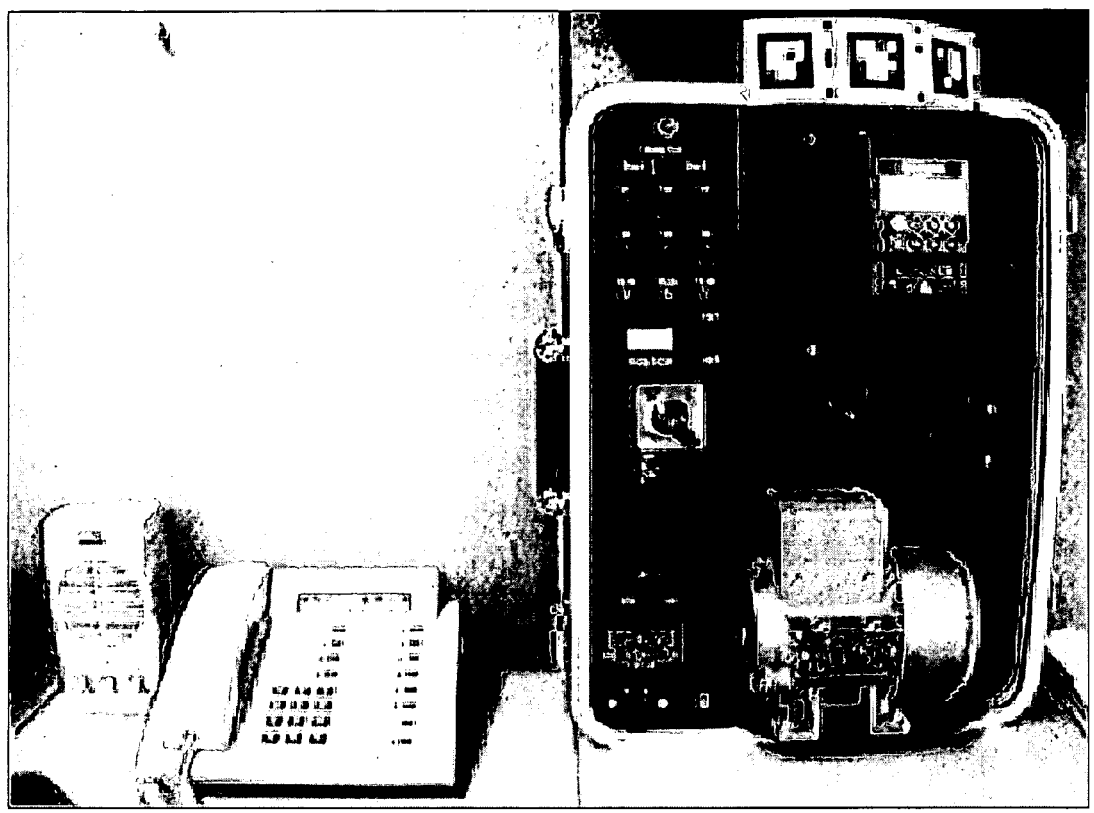
FIG. 2 depicts an exemplary setup for testing and demonstration, according to an embodiment of the invention.

Several recorded videos were used to test the proposed algorithms according to embodiments of the invention. For each test sequence, the camera starts from the initialization marker set, then moves away, and moves back. The 3D model of the initialization marker set is superimposed to visualize the residual error caused by scene and motion reconstruction errors. FIG. 2 depicts an exemplary setup for testing and demonstration, according to an embodiment of the invention. The markers for initialization are visible in the upper-right corner of the picture. FIG. 3 is a table of average back-projection error for various video sequences, according to an embodiment of the invention. Results indicate that applying proposed landmark algorithm according to an embodiment of the invention reduces the error in estimated motion and structure. A quantitative comparison for frame 606 for a first video sequence, and for frame 237 of a second video sequence, is given in the first two rows of Table 1, shown in FIG. 3. For both of these sequences, the table indicates that the average back-projection error for the visible corners of the initialization markers is [2 pixels if the texture landmarks are used but is about 9 pixels without the landmarks.

Figure 4:
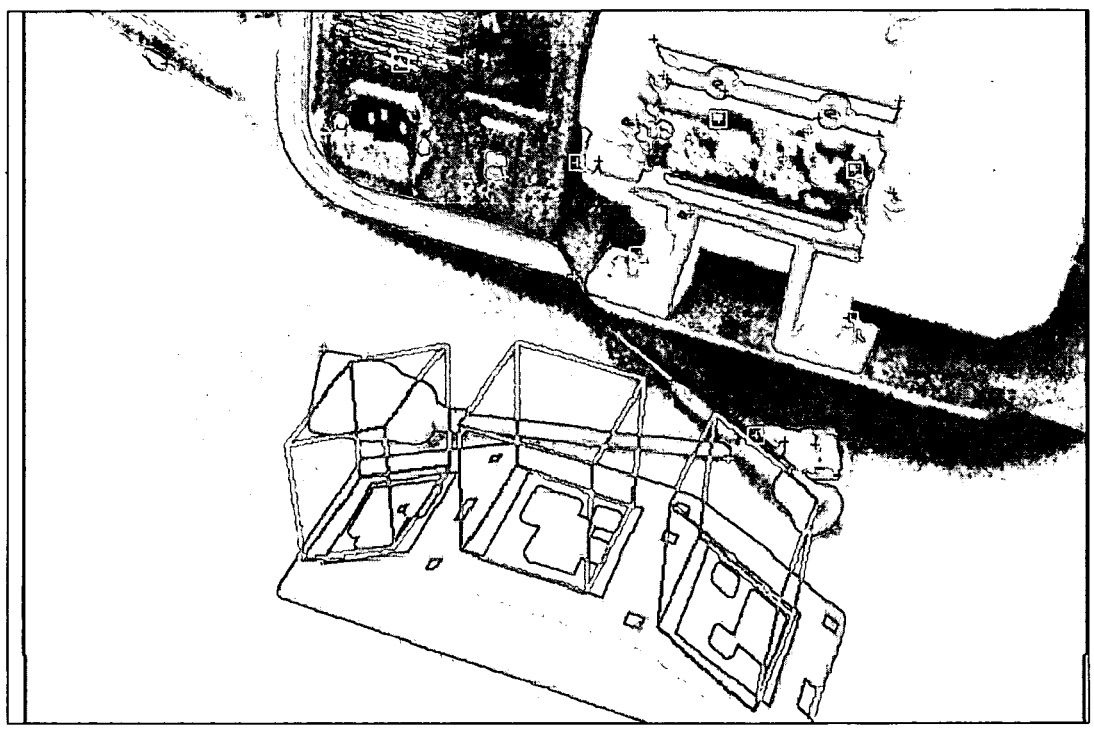
FIG. 4 depicts a setup for another exemplary video sequence, according to an embodiment of the invention.

A setup for another exemplary video sequence is depicted in FIG. 4, where the initialization marker set is randomly placed somewhere close to the object of interest. In this sequence, the camera view starts from the initialization marker set, moves away, then moves back while learning the model and tracking the camera motion simultaneously. The results, depicted in row 4 of Table 1, again show how the use of texture landmarks improves the performance of motion estimation results. In this sequence, the average back-projection error for the initialization markers is [9 pixels if the texture landmarks are used but is about 70 pixels without the landmarks.

Row 3 of Table 1 present the results from another example, a long video sequence with more than 1000 frames. In this video, abrupt camera motion causes not only large drifts, but also loss of visibility of the landmarks. Even in this case, the results show that the landmarks can still effectively improve the motion tracking. The quantitative results presented in Table 1, where the average back-projection error for the initialization markers is [21 pixels if the texture landmarks are used but is about 32 pixels without the landmarks, agree with this observation.

According to another embodiment of the invention, density matching of the edge pixel point samples can be used for camera pose estimation. The data point sets to be used are usually corrupted by noise. Due to the noisy nature of the samples, a good estimate of the underlying structure G is a probabilistic representation, specifically a probability density function $P_D$ in the 2D image domain of a test view. The density at each point is the likelihood that a point belongs to the projection of the set of curves G. According to an embodiment of the invention, a kernel density estimator (KDE) is adopted for its smooth appearance and small optimal asymptotic mean integrated squared error:

$$P_D(x) = \sum_{d \in D} K(x-d, H_d)/|D|,$$

where K(;H) is a non-negative, symmetric kernel function of order one with bandwidth matrix H. The choice of the bandwidth matrix $H_d$ should be data dependent and be a function of the covariance matrix of the noise and the true density. According to an embodiment of the invention, the edge pixel noise will be assumed to be homogeneous and isotropic. The kernels used for modeling a KDE according to an embodiment of the invention can be parameterized by a single bandwidth parameter h in this case, i.e., a diagonal bandwidth matrix $h^2 I$.

According to an embodiment of the invention, modeling errors and internal calibration errors can be assumed to be much smaller than the data errors, and the projection of the model points to a test image can be considered as noise free under the ground-truth camera pose. Thus, a noisy data point density can be simulated by using the error characteristics of the data points, namely, by assuming that they are corrupted by the same noise. The resulting model point set KDE is denoted as $P_M(x, \theta)$. A density matching framework according to an embodiment of the invention proceeds by analyzing a distance metric between the data point set KDE and the model point set KDE, once the model point set has been characterized as a set of unbiased samples of $P_D(X)$.

A first step in so characterizing the model point set is projecting point sample from 3D to 2D. A projection from 3D to 2D can be denoted as $T(, \theta)$, where $\theta$ is a parameterization of the 3D Euclidean transformation, such as Euler angles plus translation. The transformed point set $T(M, \theta)$ is usually a biased sample set of the density $P_D(x)$ due to the 3D to 2D perspective mapping. The nonlinear mapping tends to compress the projected model points in some areas, while expanding them in others, i.e., warped model points are more likely to appear in the compression areas. This is not the same point distribution as the data points, where the point-samples are drawn on a uniform raster-scan grid. Directly comparing the two density estimates would result in bias. Note that by warping only the model points to the test view, the sampling part of $\phi_d(, \theta_d)$ of the test view was ignored. To simulate the distribution of the data point distribution, the sampling process of the test view should be simulated as well. That is, the warped model points should be resampled to take samples from the uniform raster scan grids only. The warped and resampled model point set is denoted as $M'(\theta) = \phi_d(\phi_m^{-1}(M, \theta_m), \theta_d)$, namely, inverting the sampling process of the model point set and reconstructing the underlying structure G, followed by resampling the model using the sampling process of $\phi_d$.

A resampling process according to an embodiment of the invention includes the following steps.

1. Construct a continuous version of the underlying structure if it is not available. For example, one can fit line segment models or spline models to approximate the underlying curves. In this step the known connectivity among points is utilized. Note that if a CAD model of an object is known, this step can be skipped.

2. Project the continuous models to the test view given the current pose.

3. Sample the continuous model using the uniform raster grid of the imaging device.

The KDE corresponding to the warped and resampled model points M'(θ) is denoted as:

$$P_{M'}(x, \theta) = \sum_{m' \in M'(\theta)} K(x - m', h) / |M|.$$

The tracking estimation can be found from the minimum of the following cost function, the previously mentioned distance metric between the data point set KDE and the model point set KDE:

$$C(M, D, \theta) = \int_x \left( \frac{P_{M'}(x, \theta)}{\|P_{M'}\|_2} - \frac{P_D(x)}{\|P_D\|_2} \right)^2 dx,$$

where $\|f\|_2 = \sqrt{\int_x f^2(x) dx}$ is the L2 norm of f(x). The normalization terms help prevent a shrinkage problem that faces all point set registration problems when a free scale factor is involved in the transformation.

So far only data point-samples without clutter have been considered. This is equivalent to assuming clean background or known segmentation of the object of interest. Once some clutter are mixed with the data point set, the robustness of the tracking method based on minimizing the above cost fucntion is unknown. The issue of clutter can be addressed by a kernel-density correlation (KC) equivalence of the above cost function.

The KC equivalence is derived by expanding the cost function:

$$C(M, D, \theta) = 2 - 2 \frac{\int_x P_{M'}(x, \theta) P_D(x) dx}{\|P_{M'}\|_2 \|P_D\|_2},$$

and the KC between two point sets is defined as:

$$KC(M',D) = \int_x P_{M'}(x,\theta) P_D(x) dx.$$

Thus, minimizing the cost function is equivalent to maximizing a normalized KC. It has been shown that once a tracker is initialized such that M' is in the vicinity of D, the remote clutter point-samples have no influence on the estimation of the transformation. Mathematically, C denotes the clutter point-samples, and $P_D(x)+\alpha P_C(x)$ denotes the mixed point set density up to a constant scale. Substituting into the cost function definition:

$$C(M, D \cup C, \theta) = 2 - 2 \frac{KC(M', D) + \alpha KC(M', C)}{\|P_{M'}\|_2 \|P_D + \alpha P_C\|_2}.$$

For clutters whose structures are statistically uncorrelated to the model, the second KC term in the above formulation is negligible. As a result, one can still track an object by maximizing the KC. However, the tracking can fail if the initialization is wrong, or the clutter is strongly correlated to the model.

When the mapping from M to a test view involves a free scale factor, the uncluttered KC definition above has a trivial solution. If $$y^* = \arg\max_y \int_x K(x-y,h) P_D(x) dx,$$

i.e., the point at which the weighted sum of density is maximum, then it is easy to show that the KC function is maximized by a transformation that maps every model point to y*, i.e., shrinking all points to the densest part of $P_D$. However, this shrinkage phenomena does not occur if the transformation is Euclidean, because no rigid body transformation can map an arbitrary point set to a single point. However, dur to the normalized KC, as the point set shrinks, the normalization term $\|P_{M'}\|_2$ increases, penalizing unnecessary shrinkage. The normalized KC is globally maximized when the two point sets align.

To evaluate the KC function, one can begin by substituting the KDE definitions into KC function definition:

$$|D||M'(\theta)|KC(M', D) = \sum_{m' \in M'(\theta)} \sum_{d \in D} \int_x K(x - m', h) K(x - d, h) dx$$

$$= \sum_{m' \in M'(\theta)} \sum_{d \in D} KC(m', d, h)$$

where $$KC(m', d, h) = \int_x K(x - m', h) K(x - d, h) dx$$

is the KC between two points m' and d with bandwidth h. If the kernel function is a Gaussian with standard deviation h, denoted as $K_G(x,h) \propto \exp(-\|x\|^2/h^2)$, it can be shown that the corresponding KC is also a Gaussian form with bandwidth $\sqrt{2}h$: $KC_G(m',d,h) = K_G(d-m', \sqrt{2}h)$. The KC between two points is equivalent to taking values of a flatter kernel (with variance $2h^2$ instead of $h^2$) $K_G(m-d, \sqrt{2}h)$, which is interpreted as the value at m for a kernel centered at d. This KC value can be computed by evaluating a new kernel function. In the Gaussian case, this new kernel function is still Gaussian, with larger bandwidth.

If one builds the KDE $P_D'(x)$ with bandwidth $\sqrt{2}h$, the KDE value at m' is $$|D|P_D'(m') = \sum_d K_G(m' - d, \sqrt{2}h) = \sum_d KC_G(m', d, h)$$

and $$|D| \sum_{m' \in M'(\theta)} P_D'(m') = \sum_{m' \in M'(\theta)} \sum_{d \in D} KC_G(m', d, h).$$

Thus, $$KC(M', D) = \frac{1}{|M'(\theta)|} \sum_{m' \in M'(\theta)} P_D'(m'),$$

i.e. the KC between two densities, or the $L_2$ distance between the two KDE's, can be evaluated by summing the values of the new KDE $P_D'(x)$ at the transformed and resampled points m'∈M'(θ), then divided by the number of resampled points.

This process is referred to as a density sampling equivalence of the $L_2$ distance evaluation. A tracking method according to an embodiment of the invention can be designed as finding the maximum sum of $P_D'(m')$ divided by $|M'(\theta)|$ and the $L_2$-norm of $P_{M'}$.

According to an embodiment of the invention, for kernels other than Gaussian, the new KC function KC(m',s,h) usually has a different form from K(x,h), but the KC function usually can still be represented by an analytical function, and the density $P_D'(x)$ can still be computed and the density sampling equivalence holds.

According to an embodiment of the invention, one can work the other way around by choosing a KC function directly, and, if needed, the corresponding kernel function can be inversely deducted from the cost function definition. This is usually a non-trivial task. Fortunately, this inverse deduction of a kernel function is not necessary.

Note that density sampling and KC are equivalent only for homogeneous and isotropic kernels. The justifications of the density sampling methods cannot be extended directly to the inhomogeneous or anisotropic kernels. However, for the applications at hand, it is not important to use these kernels.

According to an embodiment of the invention, a simplified version of the density sampling approach assumes as input a set of curves each of which is represented by a sorted set of point-samples along the curve. An approximate method enforces the minimum distances δ between two resampled points. The distance can be either a geodesic distance along the warped curve or a city-block distance. The first point on a curve is always projected to the test view and taken as a resampled point. Starting from the second model point m∈M on a curve, each point is warped to the test view. But a warped point is taken as a resampled point only if its distance to the previously resampled point is greater than δ. This approach ensures a minimum gap between two resampled points, thus avoiding dense accumulation of warped points. On the other hand, if it is possible to choose δ such that it is greater than a maximum distance between any two consecutively warped points, one can also avoid sparse distribution at the expansion part of a transformation. A simplified density sampling method according to an embodiment of the invention provides an approximately uniform resampled point set without using any parametric form of the underlying curve.

Figure 5:
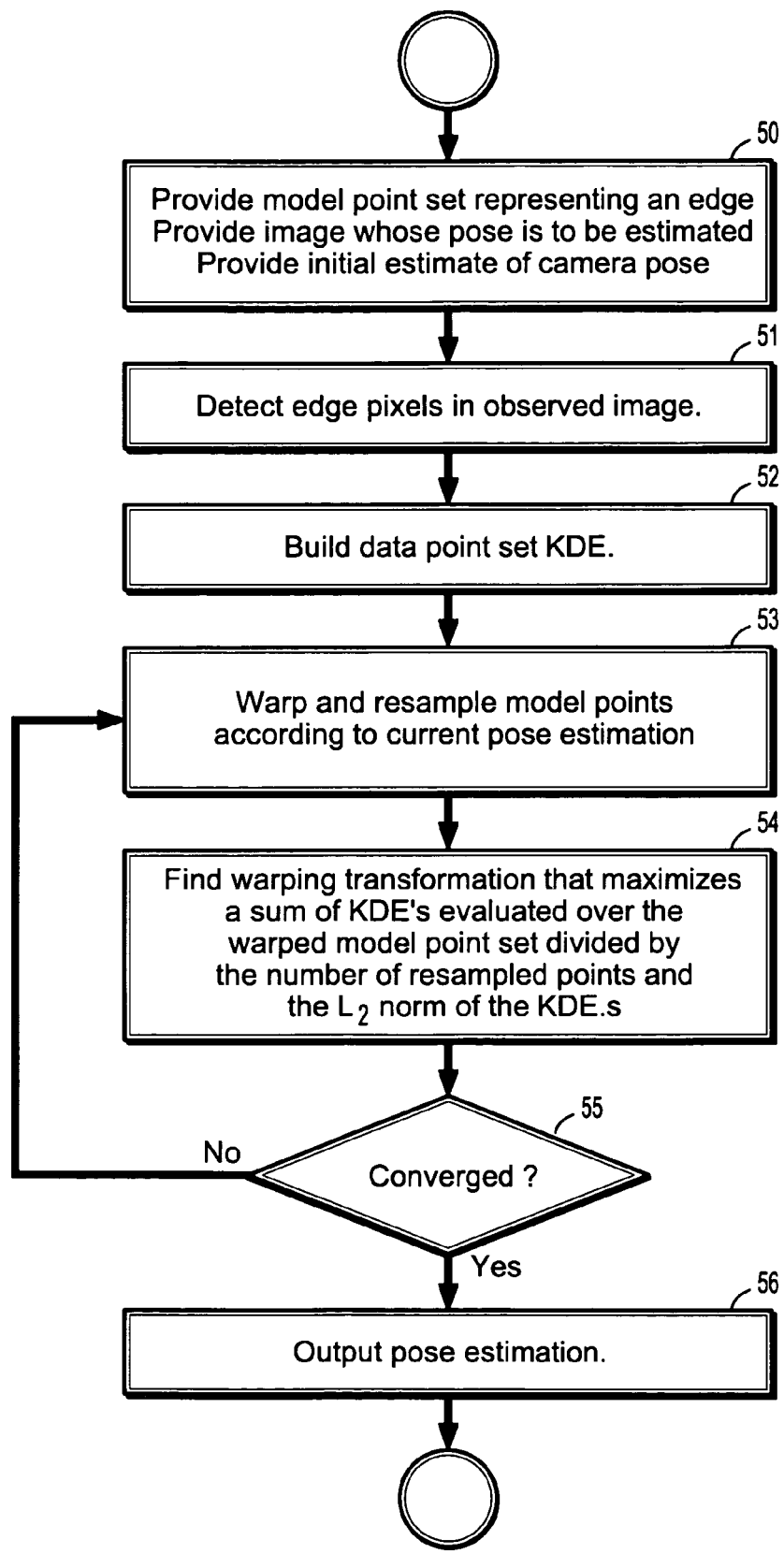
FIG. 5 is a flow chart of a pose tracking algorithm according to an embodiment of the invention

A flow chart of a pose tracking algorithm according to an embodiment of the invention is depicted in FIG. 5. Referring to the figure, at step 50, inputs are provided, including (1) a set of spatial curves represented by a model point set M; (2) an image whose corresponding camera pose is to be estimated; and (3) an initial pose estimation $\theta^{(0)}$ for the first frame.

At step 51, the edge pixels D are detected in the observed image. The data point set KDE $P_D'(x)$ is built at step 52 using the adjusted kernel bandwidth and/or function. At step 53, the model points are warped and resampled according to the current pose estimation $\theta^{(n)}$. The best warping transformation maximizing $$KC(M', D) = \frac{1}{|M'(\theta)|} \sum_{m' \in M'(\theta)} P_D'(m'),$$

normalized by $\|P_{M'(\theta)}\|_2$ is found at step 54 using the current set of resampled points. This warping transformation yields a current estimate of the camera pose. Steps 53 and 54 are repeated until a predetermined convergence criteria for the pose estimation is satisfied at step 55. At step 56, the pose estimation for the frame is output, and the method proceeds to the next frame.

Note that one need not repeat the resampling step 53 if the view change is known to be small, such as the transformation between successive frames in a video stream.

Due to the smooth nature of the KDE's, a gradient descent based method can perform the optimization at each step. According to an embodiment of the invebntion, an exemplary choice is the variable metric method.

A pose estimation method according to an embodiment of the invention has been tested with both synthetic sequences and real sequences. Results of these tests demonstrate the usefulness of resampling, and that methods according to embodiments of the invention are accurate, robust, and lead to improved stereo reconstruction.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 6:
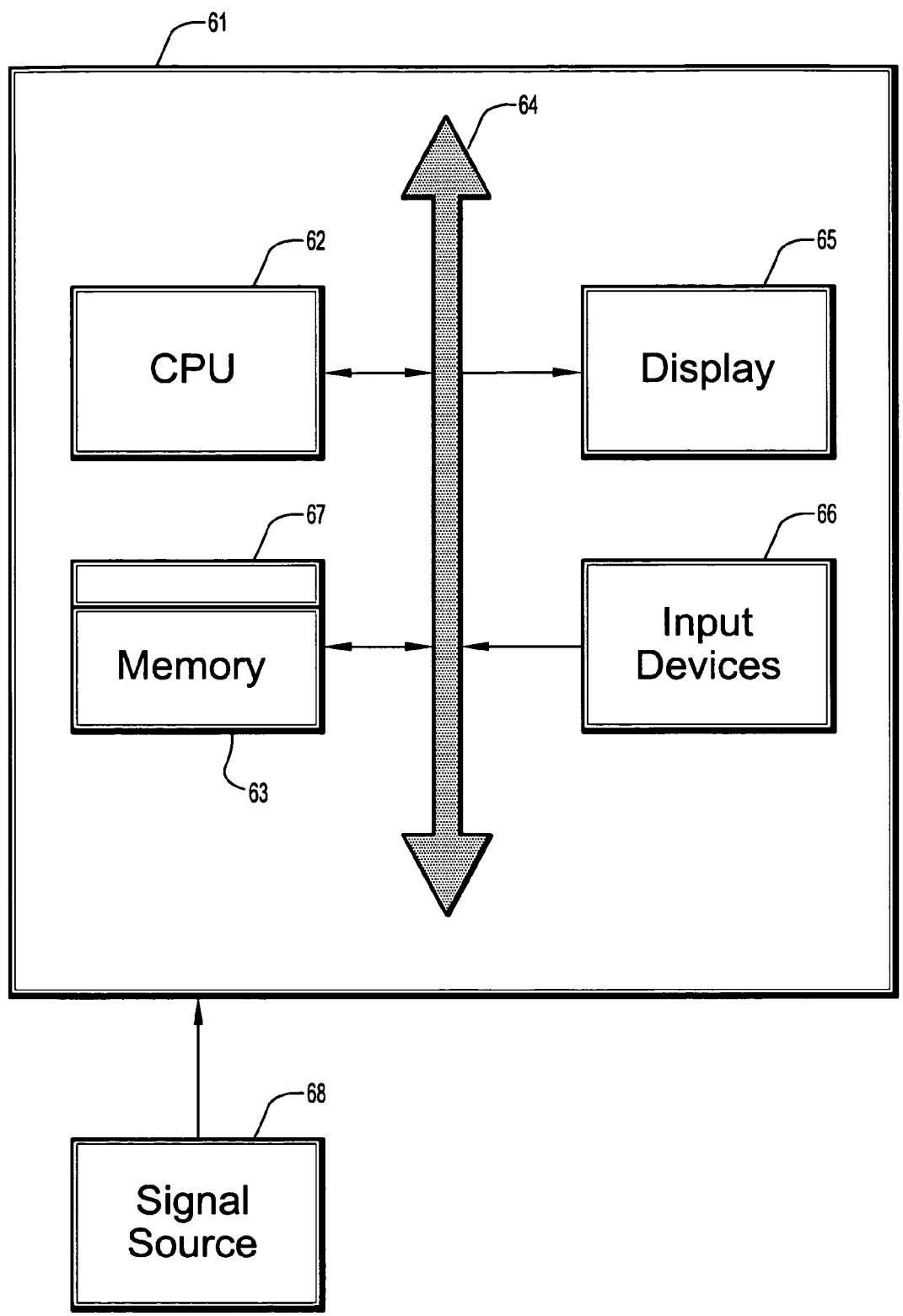
FIG. 6 is a block diagram of an exemplary computer system for implementing a method for camera tracking and pose estimation according to an embodiment of the invention.

FIG. 6 is a block diagram of an exemplary computer system for implementing a camera tracking and pose estimation method according to an embodiment of the invention. Referring now to FIG. 6, a computer system 61 for implementing the present invention can comprise, inter alia, a central processing unit (CPU) 62, a memory 63 and an input/output (I/O) interface 64. The computer system 61 is generally coupled through the I/O interface 64 to a display 65 and various input devices 66 such as a mouse and a keyboard. The support circuits can include circuits such as cache, power supplies, clock circuits, and a communication bus. The memory 63 can include random access memory (RAM), read only memory (ROM), disk drive, tape drive, etc., or a combinations thereof. The present invention can be implemented as a routine 67 that is stored in memory 63 and executed by the CPU 62 to process the signal from the signal source 68, such as a camera. As such, the computer system 61 is a general purpose computer system that becomes a specific purpose computer system when executing the routine 67 of the present invention.

The computer system 61 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer implemented method of tracking a pose of a moving camera, the method performed by the computer comprising the steps of:

receiving a first received digitized image from a camera, said image comprising a plurality of intensities corresponding to a domain of points on a 2-dimensional grid, and including one or more landmarks for tracking;

receiving a sequence of digitized images from said camera, each image comprising a plurality of intensities corresponding to a domain of points on a 2-dimensional grid;

recording, for each of said sequence of digitized images, the pose and 2D correspondences of each of said landmarks;

reconstructing a location and appearance of a 2-dimensional texture patch from the 2D correspondences of the landmarks of said sequence of digitized images by triangulation and optimization;

computing back-projection errors by comparing said reconstructed texture patch with said first received image;

reconstructing said location and appearance of said 2-dimensional texture patch from the 2D correspondences of the landmarks of said sequence of digitized images by triangulation and optimization after eliminating those landmarks with large back-projection errors searching for a best match of each landmark correspondence in said reconstructed texture patch, wherein a search range is determined by a maximum back-projection error, wherein said best match is found by minimizing a sum of square differences $$d(I_{norm})^2 = \sum_{i=0, j=0}^{i<n_p, j<n_p} (I_c^{norm}(i_c, j_c) - I_0^{norm}(i, j))^2,$$

wherein $n_p$ is a size of said texture patch for each landmark, $i_c$ and $j_c$ are feature point coordinates, $I_{norm}$ is the normalized intensity of a point defined by $$I_{norm} = \frac{I - I_{avg}}{I_{max} - I_{min}},$$

wherein I is a intensity before normalization, and $I_{avg}$, $I_{max}$ and $I_{min}$, are the average, maximum, and minimum intensity values of the texture patch, respectively; and determining a likelihood score $S_{l,k}$ for each feature point k of landmark l from $$S_{l,k} = w_\lambda (\lambda(u_c, v_c) - \lambda_0) + w_I \sqrt{d(I_{norm})^2} / n_{pix},$$

wherein $n_{pix}$ is the number of pixels in the texture patch of landmark l, $\lambda(u_c, v_c)$ and $\lambda_0$ are the smallest eigenvalues of the current candidate pixel $(u_c, v_c)$ and the original pixel, respectively, and $w_\lambda$ and $w_I$ are predetermined weighting factors.

2. The method of claim 1, wherein said sequence of images comprises a plurality of intensities corresponding to a domain of points on a 3-dimensional (3D) grid.

3. The method of claim 1, wherein recording the pose and 2D correspondences of each of said landmarks comprises recording a texture patch about each said landmark, the camera pose from which said texture patch is obtained, and about each said landmark, a set of 3D coordinates of nearby neighbor features.

4. The method of claim 3, wherein said one or more landmarks are selected based on how well its 3D coordinates can be reconstructed, and wherein said landmarks are evenly distributed among the reconstructed landmarks.

5. The method of claim 4, wherein said one or more landmarks are selected based on a reliability measure r comprising the term $b_{max}/(\epsilon_{avg}+\epsilon_{std})$, wherein $b_{max}$ is a maximum distance between camera centers, $\epsilon_{avg}$ is an average back-projection error distance, and $\epsilon_{std}$ is a standard deviation of back-projection errors.

6. The method of claim 4, wherein said landmarks are separated by at least a pre-defined threshold distance in the reconstructed image.

7. The method of claim 1, further comprising deforming the landmark feature coordinates $i_c$ and $j_c$ using an approximate affine transformation $$i_c = a_{11}(i_0 - n_p/2) + a_{12}(j_0 - n_p/2) + u_c,$$

$$j_c = a_{21}(i_0 - n_p/2) + a_{22}(j_0 - n_p/2) + v_c,$$

wherein $u_c$ and $v_c$ are landmark coordinates, $i_0$ and $j_0$ are landmark feature coordinates in the first image, and $a_{11}$, $a_{12}$, $a_{21}$, and $a_{22}$ are elements of a matrix that back-projects landmark coordinates $u_c$, $v_c$ to the corresponding coordinates in the first image.

8. The method of claim 7, further comprising using a RANSAC algorithm to eliminate those landmarks with large back-projection errors.

9. The method of claim 1, wherein said landmarks comprise corners and edges of an object depicted in said first image.

10. A program storage device readable by a computer, tangibly embodying a program of instructions executable by the computer to perform the method steps for tracking a pose of a moving camera, said method comprising the steps of:

receiving a first received digitized image from a camera, said image comprising a plurality of intensities corresponding to a domain of points on a 2-dimensional grid, and including one or more landmarks for tracking;

receiving a sequence of digitized images from said camera, each image comprising a plurality of intensities corresponding to a domain of points on a 2-dimensional grid;

recording, for each of said sequence of digitized images, the pose and 2D correspondences of each of said landmarks, wherein recording the pose and 2D correspondences of each of said landmarks comprises recording a texture patch about each said landmark, the camera pose from which said texture catch is obtained, and about each said landmark, a set of 3D coordinates of nearby neighbor features, wherein said one or more landmarks are selected based on how well its 3D coordinates can be reconstructed, and wherein said landmarks are evenly distributed among the reconstructed landmarks based on a reliability measure r comprising the term $b_{max}/(\epsilon_{avg}+\epsilon_{std})$, wherein $b_{max}$ is a maximum distance between camera centers, $\epsilon_{avg}$ is an average back-projection error distance, and $E_{std}$ is a standard deviation of back-projection errors;

reconstructing a location and appearance of a 2-dimensional texture patch from the 2D correspondences of the landmarks of said sequence of digitized images by triangulation and optimization;

computing back-projection errors by comparing said reconstructed texture patch with said first received image; and reconstructing said location and appearance of said 2-dimensional texture patch from the 2D correspondences of the landmarks of said sequence of digitized images by triangulation and optimization after eliminating those landmarks with large back-projection errors.

11. The computer readable program storage device of claim 10, wherein said sequence of images comprises a plurality of intensities corresponding to a domain of points on a 3-dimensional (3D) grid.

12. The computer readable program storage device of claim 10, wherein said landmarks are separated by at least a pre-defined threshold distance in the reconstructed image.

13. The computer readable program storage device of claim 10, the method further comprising searching for a best match of each landmark correspondence in said reconstructed texture patch, wherein a search range is determined by a maximum back-projection error, wherein said best match is found by minimizing a sum of square differences $$d(I_{norm})^2 = \sum_{i=0,j=0}^{i<n_p,j<n_p} (I_c^{norm}(i_c, j_c) - I_0^{norm}(i, j))^2,$$

wherein $n_p$ is a size of said texture patch for each landmark, $i_c$ and $j_c$ are feature point coordinates, $I_{norm}$ is the normalized intensity of a point defined by $$I_{norm} = \frac{I - I_{avg}}{I_{max} - I_{min}},$$

wherein I is a intensity before normalization, and $I_{avg}$, $I_{max}$, and $I_{min}$ are the average, maximum, and minimum intensity values of the texture patch, respectively.

14. The computer readable program storage device of claim 13, the method further comprising deforming the landmark feature coordinates $i_c$ and $j_c$ using an approximate affine transformation $$i_c = a_{11}(i_0 - n_p/2) + a_{12}(j_0 - n_p/2) + u_c,$$

$$j_c = a_{21}(i_0 - n_p/2) + a_{22}(j_0 - n_p/2) + v_c,$$

wherein $u_c$ and $v_c$ are landmark coordinates, $i_0$ and $j_0$ are landmark feature coordinates in the first image, and $a_{11}$, $a_{12}$, $a_{21}$, and $a_{22}$ are elements of a matrix that back-projects landmark coordinates $u_c$, $v_c$ to the corresponding coordinates in the first image.

15. The computer readable program storage device of claim 14, further comprising using a RANSAC algorithm to eliminate those landmarks with large back-projection errors.

16. The computer readable program storage device of claim 13, the method further comprising determining a likelihood score $S_{l,k}$ for each feature point k of landmark l from $$S_{l,k} = w_\lambda(\lambda(u_c, v_c) - \lambda_0) + w_I \sqrt{d(I_{norm})^2 / n_{pix}},$$

wherein $n_{pix}$ is the number of pixels in the texture patch of landmark l, $\lambda(u_c, v_c)$ and $\lambda_0$ are the smallest eigenvalues of the current candidate pixel $(u_c, v_c)$ and the original pixel, respectively, and $w_\lambda$ and $w_I$ are predetermined weighting factors.

17. The computer readable program storage device of claim 10, wherein said landmarks comprise corners and edges of an object depicted in said first image.

* * * * *

UNITED STATES PATENT AND TRADEMARK OFFICE
CERTIFICATE OF CORRECTION

PATENT NO. : 7,616,807 B2  Page 1 of 1
APPLICATION NO. : 11/359673
DATED : November 10, 2009
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 933 days.

Signed and Sealed this

Nineteenth Day of October, 2010

David J. Kappos
*Director of the United States Patent and Trademark Office*